(12) United States Patent
Amiton et al.

(10) Patent No.: US 7,110,496 B1
(45) Date of Patent: Sep. 19, 2006

(54) PORTABLE SYSTEM AND METHOD FOR NON-INTRUSIVE RADIOSCOPIC IMAGING

(75) Inventors: Richard Amiton, San Marcos, CA (US); Gary Rush, San Diego, CA (US); Robert Sullivan, San Diego, CA (US)

(73) Assignee: Science Applications International Corporation, San Diego, CA (US)

(*) Notice: Subject to any disclaimer, the term of this patent is extended or adjusted under 35 U.S.C. 154(b) by 72 days.

(21) Appl. No.: 10/895,077

(22) Filed: Jul. 21, 2004

(51) Int. Cl.
*H05G 1/64* (2006.01)

(52) U.S. Cl. ............... 378/98.12; 378/62; 378/162; 382/132; 382/294; 250/366; 250/368

(58) Field of Classification Search .......... 378/98.12, 378/98.5, 62, 162, 98.8; 250/366, 368; 382/132, 382/284, 287, 294
See application file for complete search history.

(56) References Cited

U.S. PATENT DOCUMENTS

| | | | | |
|---|---|---|---|---|
| 3,944,835 A | 3/1976 | Vosburgh | ................. | 250/487.1 |
| 4,383,327 A | 5/1983 | Kruger | ................. | 378/19 |
| 4,497,036 A | 1/1985 | Dunn | ................. | 361/680 |
| 4,593,400 A | 6/1986 | Mouyen | ................. | 378/98.8 |
| 4,612,660 A | 9/1986 | Huang | ................. | 378/44 |
| 4,736,239 A | 4/1988 | Sprague et al. | ................. | 348/717 |
| 4,912,333 A | 3/1990 | Roberts et al. | ................. | 250/487.1 |
| 4,982,283 A | 1/1991 | Acampora | ................. | 375/240.12 |
| 5,008,547 A | 4/1991 | Molteni et al. | ................. | 250/368 |
| 5,047,642 A | 9/1991 | Pleyber et al. | ................. | 250/368 |
| 5,127,032 A | 6/1992 | Lam et al. | ................. | 378/189 |
| 5,150,394 A | 9/1992 | Karellas | ................. | 378/62 |
| 5,235,191 A | 8/1993 | Miller | ................. | 250/486.1 |
| 5,283,101 A | 2/1994 | Li | ................. | 428/141 |
| 5,412,705 A | 5/1995 | Snoeren et al. | ................. | 378/98.3 |
| 5,434,418 A | 7/1995 | Schick | ................. | 250/370.11 |
| 5,452,337 A | 9/1995 | Endo et al. | ................. | 378/4 |
| 5,454,022 A | 9/1995 | Lee et al. | ................. | 378/98.8 |
| 5,465,284 A | 11/1995 | Karellas | ................. | 378/62 |

(Continued)

FOREIGN PATENT DOCUMENTS

EP 0429977 6/1991

OTHER PUBLICATIONS

"RTR-4 Portable Digital X-Ray Imaging System," Operator's Manual, 120300 Rev. D, 117 pp., Feb. 15, 2003.

(Continued)

*Primary Examiner*—Edward J. Glick
*Assistant Examiner*—Jurie Yun
(74) *Attorney, Agent, or Firm*—Kilpatrick Stockton LLP

(57) ABSTRACT

Described herein is a portable, self-contained, electronic radioscopic imaging system that utilizes a multiple camera imager and advanced processing techniques to image suspicious containers. An X-ray sensor or imager utilizes a scintillating screen that produces flashes of light when impinged by an X-ray in combination with at least one camera, or the like, to produce an integrated signal that represents the sum of a prescribed number of flashes of radiation that pass through the object in a given pixel area. A self-contained display and control unit utilizes digital signal processing in order to display to an operator the full dynamic range and resolution of an image-capturing novel sensor utilized within the imager.

18 Claims, 9 Drawing Sheets

U.S. PATENT DOCUMENTS

| | | | | |
|---|---|---|---|---|
| 5,550,380 | A | 8/1996 | Sugawara et al. | 250/370.11 |
| 5,584,292 | A | 12/1996 | Cheung | 600/567 |
| 5,608,774 | A | 3/1997 | Polichar et al. | 378/98.8 |
| 5,617,463 | A | 4/1997 | Beierlein | 378/98.3 |
| 5,631,942 | A * | 5/1997 | Shinoda | 378/98.12 |
| 5,650,213 | A | 7/1997 | Rizika et al. | 428/143 |
| 5,724,402 | A | 3/1998 | Grady | 378/98.3 |
| 5,828,726 | A | 10/1998 | Polichar et al. | 378/98.2 |
| 5,909,478 | A | 6/1999 | Polichar et al. | 378/98.2 |
| 5,986,279 | A * | 11/1999 | Dewaele | 250/582 |
| 6,178,224 | B1 | 1/2001 | Polichar et al. | 378/98.2 |
| 6,205,199 | B1 | 3/2001 | Polichar et al. | 378/98.8 |
| 6,215,848 | B1 * | 4/2001 | Linders et al. | 378/98.12 |
| 6,389,105 | B1 | 5/2002 | Polichar et al. | 378/98.3 |
| 6,628,751 | B1 * | 9/2003 | Eikenberg | 378/98.12 |
| 6,714,622 | B1 * | 3/2004 | Horbaschek | 378/98.12 |

OTHER PUBLICATIONS

Street, et al., "Amorphous Silicon Arrays Develop a Medical Image," *IEEE*, pp. 38-42 (Jul. 1993).

Tannas, Evolution of Flat-Panel Displays, *Proceedings of the IEEE*, 82:4, pp. 499-509 (Apr. 1994).

Antonuk, et al., "Considerations for High Frame Rate Operation of Two-Dimensional a-Si:H Imaging Arrays," *Materials Research Society Symposium Proceedings*, 297:945-950 (1993).

VIDISCO, Ltd., Sales Brochure for "A-500E Portable Video Based X-Ray Inspection System" (1994).

Wu, et al., "Imaging With Page-Sized A-Si:H 2-Dimensional Sensor Arrays," *SPIE Proceedings*, vol. 2172, pp. 144-154, May 1994.

\* cited by examiner

PORTABLE SYSTEM AND METHOD FOR NON-INTRUSIVE RADIOSCOPIC IMAGING

BACKGROUND OF THE INVENTION

1. Field of the Invention

The present invention relates generally to the field of radioscopic imaging and more particularly to the field of non-intrusive imaging utilizing a portable device.

2. Description of the Related Art

There are many instances in the security or customs field when it is necessary to examine or inspect, in a non-destructive way, the contents of a closed package, box, suitcase, or other container. For example, customs departments are routinely charged with the responsibility of inspecting the contents of incoming packages to make sure such packages do not contain explosives, drugs or other contraband. Similarly, terrorists, criminals, or other enemies frequently carry out their criminal acts of terrorism or war by planting bombs in sealed containers or packages, and then sending the sealed containers/packages to the intended victims, e.g., through the mail, or planting the sealed container/packages at the desired target, e.g., by leaving a locked suitcase or a sealed box containing a bomb in a busy public transportation terminal. When security personnel encounter suspicious packages or other containers being sent through the mail, or left at public transportation terminals, or other locations, they must perform a careful inspection of such containers to ascertain their contents.

The inspection of suspicious containers, e.g., suitcases, sealed boxes/packages and the like usually occurs on location in a non-destructive manner, so as to avoid triggering any explosive materials within the suspicious container. Although portable systems do exist for this purpose, such systems are limited in their imaging capabilities. Known systems utilize, for example, an x-ray source with detector and a single camera for imaging the suspicious containers. The reliance on a single camera limits the size of the resulting image. In cases where the suspicious package is larger than the imaging area, it would be necessary to move the system and capture multiple images in order to adequately inspect the entire container. This is inefficient and potentially dangerous since time may be of the essence when unknowingly inspecting timed explosive devices. Further, multiple images of a single container are not easily analyzed as they may be difficult to align in order to cover the entirety of the container and image small objects-of-interest, such as a trigger. Taking multiple images of a single container by moving the inspection device, results in a variance of image quality, compounding an already difficult task of stitching images together to form one complete image of the container being inspected.

SUMMARY OF THE INVENTION

Summary of the Problem:

Known non-intrusive, portable imaging systems are limited by a single camera configuration which, depending on the size and shape of the container being inspected, is not efficient for displaying a single, cohesive image of the entire container.

Summary of the Solution:

Embodiments of the present invention describe fully-digital portable x-ray systems and methods that provide for the ability to quickly and efficiently search for weapons, drugs, and contraband in areas too difficult or time-consuming to search by hand. The systems and methods meet the intended purpose of enhancing the safety margin for operators and innocent civilians while effectively inspecting suspect packages. The embodied systems and methods are useful for numerous operators and situations such as Improvised Explosive Device (IED) evaluation and disposal, wherein bomb technicians from a variety of law enforcement and military organizations investigate suspicious packages for the presence of IEDs; Unexploded Ordnance (UXO) disposal to evaluate unexploded ordnance and determine fusing condition; mail and package evaluation in a mailroom scenario, as well as point-of-entry examination of personal belongings; customs investigations of private vehicles and other odd-shaped objects not appropriate for an x-ray baggage scanner; and Non-Destructive Evaluation/Testing/Inspection (NDE/NDT/NDI) for process control of component assembly, honeycomb aerospace structures and wood building structures.

In a first exemplary embodiment of the present invention, a system for forming a single radiographic image of the contents of a target includes an imager for producing multiple partial radiographic images of the contents of the target and multiple fiducials located in an image plane of each of the multiple partial radiographic images configured to facilitate the alignment of each of the multiple partial radiographic images in an overlapping fashion to produce the single radiographic image of the contents of the target.

In a second exemplary embodiment of the present invention, a method for forming a single radiographic image of the contents of a target includes simultaneously producing multiple partial radiographic images of the contents of the target, each of the multiple partial radiographic images including multiple images of fiducials; aligning each of the multiple partial radiographic images according to the images of the multiple fiducials to produce the single radiographic image of the contents of the target; and visually removing the images of the multiple fiducials from the single radiographic image of the contents of the target.

In a third exemplary embodiment of the present invention, a system for forming a single radiographic image of the contents of a target includes means for simultaneously producing multiple partial radiographic images of the contents of the target, each of the multiple partial radiographic images including multiple images of fiducials; means for aligning each of the multiple partial radiographic images according to the images of the multiple fiducials to produce the single radiographic image of the contents of the target; and means for visually removing the images of the multiple fiducials from the single radiographic image of the contents of the target.

DETAILED DESCRIPTION OF THE PREFERRED EMBODIMENTS OF THE PRESENT INVENTION

The present invention addresses the above and other goals by providing a portable, self-contained, electronic radioscopic imaging system that utilizes a multiple camera imager and advanced processing techniques to image suspicious containers. Generally, the system is made up of three main subsystems: (1) a pulsed X-ray source, (2) a remote X-ray sensor, or "imager", and (3) a self-contained, display and controller unit, or "display/control unit." The pulsed X-ray source transmits narrow pulses of X-rays at the object being investigated at a low repetition rate. The X-ray sensor or imager utilizes a scintillating screen that produces flashes of light when impinged by an X-ray in combination with at least one camera, or the like, to produce an integrated signal that represents the sum of a prescribed number of flashes of radiation that pass through the object in a given pixel area. The self-contained display and control unit utilizes digital signal processing in order to display to an operator the full dynamic range and resolution of an image-capturing novel sensor utilized within the imager.

Figure 1:
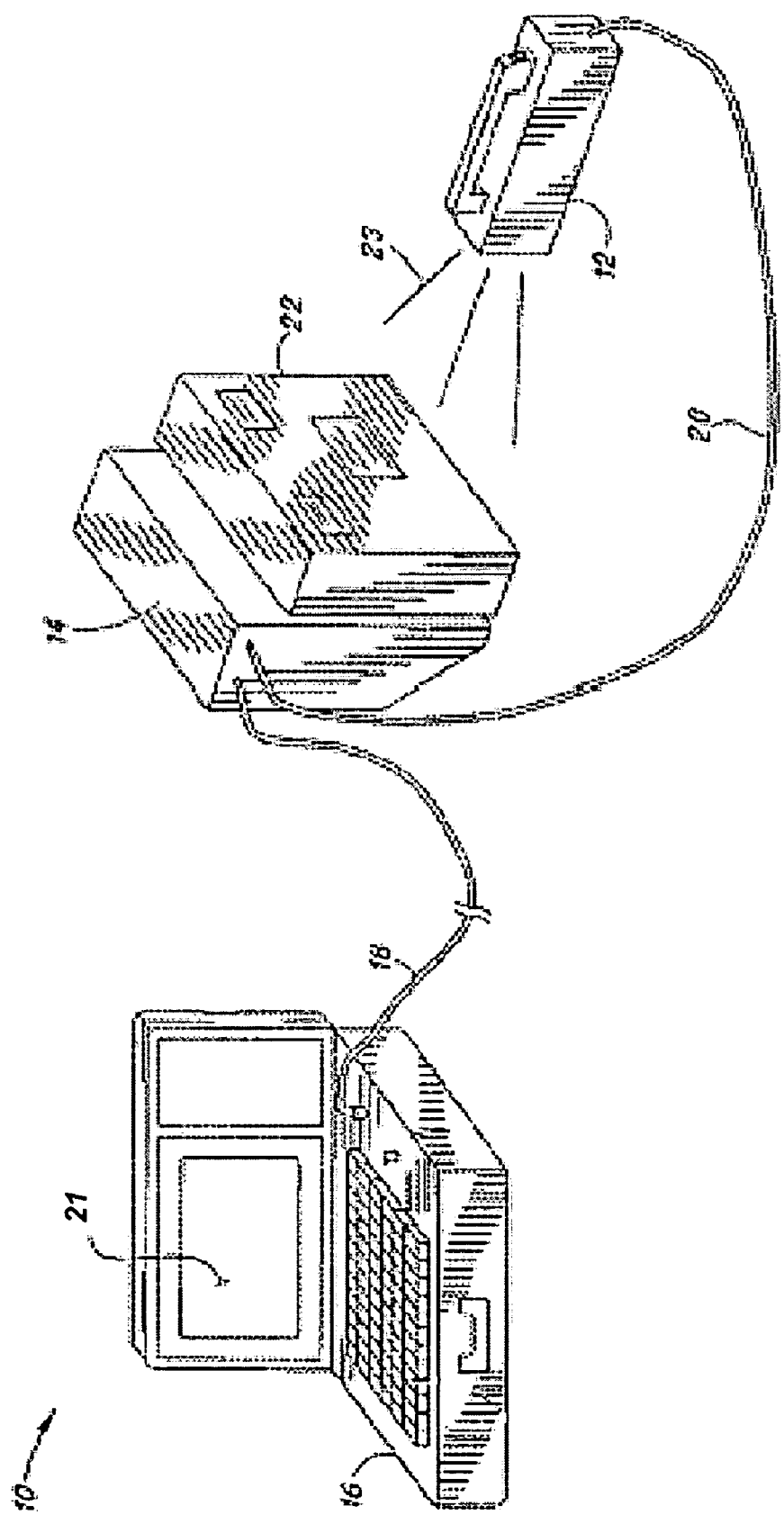
FIG. 1 illustrates an exemplary imaging configuration according to an embodiment of the present invention.

Referring to FIG. 1, there is shown an exemplary imaging system configuration 10 as described and illustrated in commonly owned U.S. Pat. No. 5,608,774, which is incorporated herein by reference in its entirety. The system 10 includes three main subsystems: (1) a portable X-ray source 12, (2) an imager 14, and (3) a Display/Control Unit 16 (hereafter "controller"). This exemplary overall configuration is also used in the embodiments of the present invention. Advantageously, the system 10 is portable, which means it is sufficiently lightweight and non-bulky to enable a single person to hand-carry its three constituent subsystems and associated cables to a field location where an object 22 to be investigated is located. Once on site, the system 10 is designed to: (1) facilitate quick and easy setup around the object 22 to be investigated, (2) provide rapid image acquisition at the field location, and (3) provide image enhancement tools that aid in the evaluation of the acquired image.

In operation, the system 10 is setup by placing imager 14 next to the object 22 to be investigated, e.g., as close as possible to the object. The X-ray source 12 is then placed, e.g., two to three feet from the imager 14, on the opposite side of the object 22. The display/control unit 16 is then connected to the imager by way of the long cable or wireless configuration 18 and is placed a safe distance from the object 22. The X-ray source is also connected to the imager 14 by way of the short cable or wireless configuration 20. When everything is properly connected, all three subsystems are turned on, and under control of the display/control unit 16, the X-ray source 12 generates a pulsed X-ray beam (represented by the lines 23) that is allowed to pass through the object 22. The pulsed X-rays pass through respective segments of the object 22 with varying degrees of intensity, or energy, as a function of the contents of the object 22, and are captured or sensed at corresponding pixel areas of the imager 14. The intensity or energy of these pulses that pass through the object 22 are accumulated or summed (integrated) over the duration of the pulsed beam (exposure time), which exposure time may include, e.g., a burst of 1–99 pulses. An image of object 22 is shown on image screen 21 of the display/control unit 16.

The X-ray source 12 utilized in embodiments of the present invention includes an X-ray tube for producing X-rays, a lead collimator for directing X-rays to a 40-degree beam width and height, and battery power source. X-rays are a type of light with higher energy than visible and ultraviolet light, in the energy range of approximately 150–300 KeV. Suitable X-ray sources are available from, for example, Golden Engineering, e.g., the Golden Engineering XR-200, Golden Engineering XR-150 and Golden Engineering XRS-3 but one skilled in the art recognizes the many alternative sources that may be used and still fall within the scope of the invention described herein. In a preferred embodiment X-ray source is a pulsed 150 kV unit with a 40° beam angle which produces extremely short bursts of X-rays capable of penetrating several centimeters of most materials, e.g., steel, wood, rubber, etc.

Figure 2B:
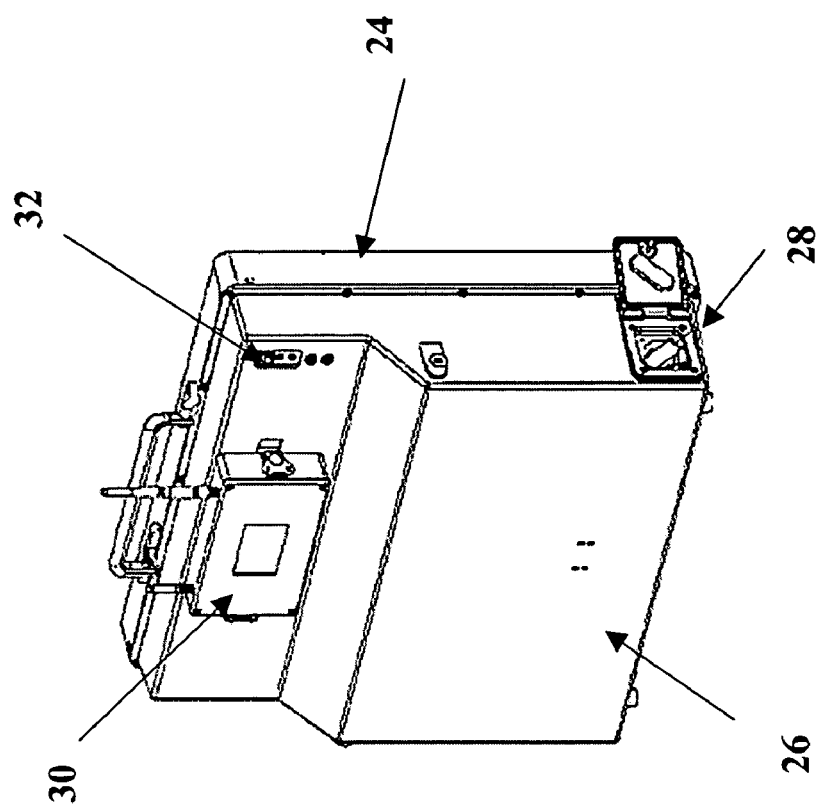
FIGS. 2a and 2b illustrate front and back perspectives of an imager component according to an embodiment of the present invention.
Figure 2A:
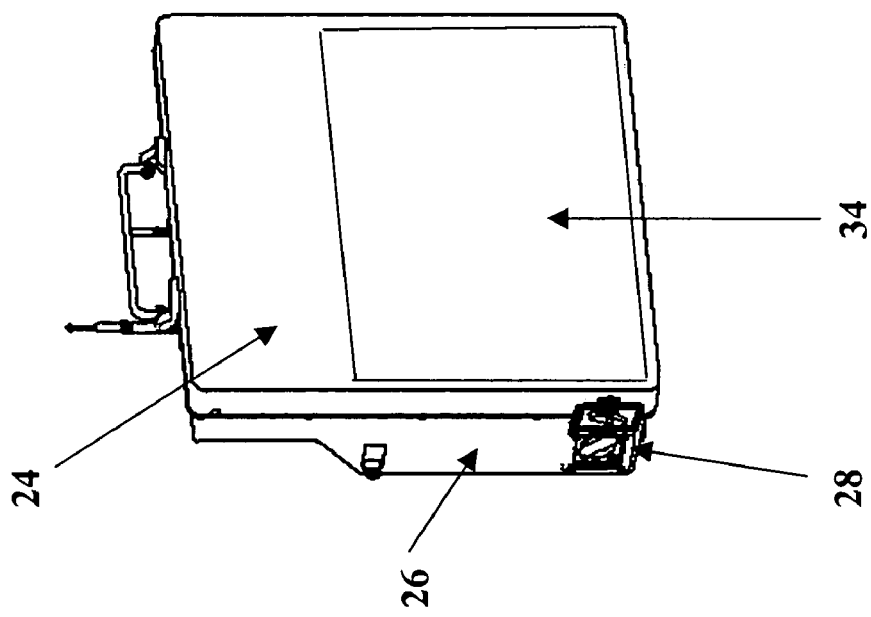

Referring to FIGS. 2a–2b, an external front and back view of the imager 14 are shown. The external components of the imager 14 include base 24, cover 26, battery compartment 28, wireless module 30, cable input/output 32 and conversion, i.e., scintillator, screen 34. Scintillator screen 34 converts impinging X-rays from the X-ray source into photons after the X-rays have passed through the object 22 (see FIG. 1). Preferably, the imager 14 can be hand carried, having dimensions of approximately 51 cm×61 cm×19 cm.

Figure 3A:
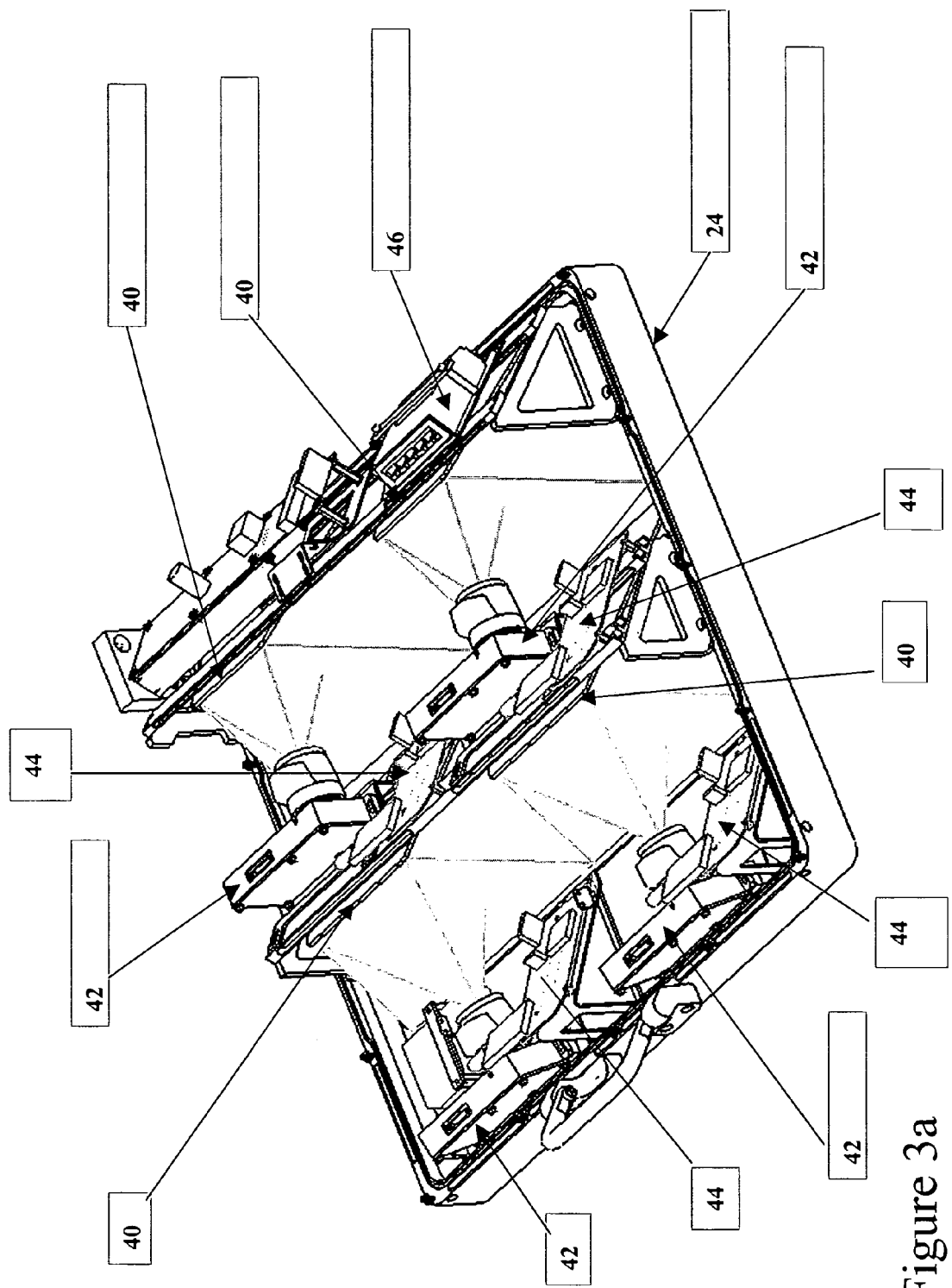
FIGS. 3a and 3b illustrate top-view perspectives of the internal configuration of an imager component according to alternative embodiments of the present invention.
Figure 4:
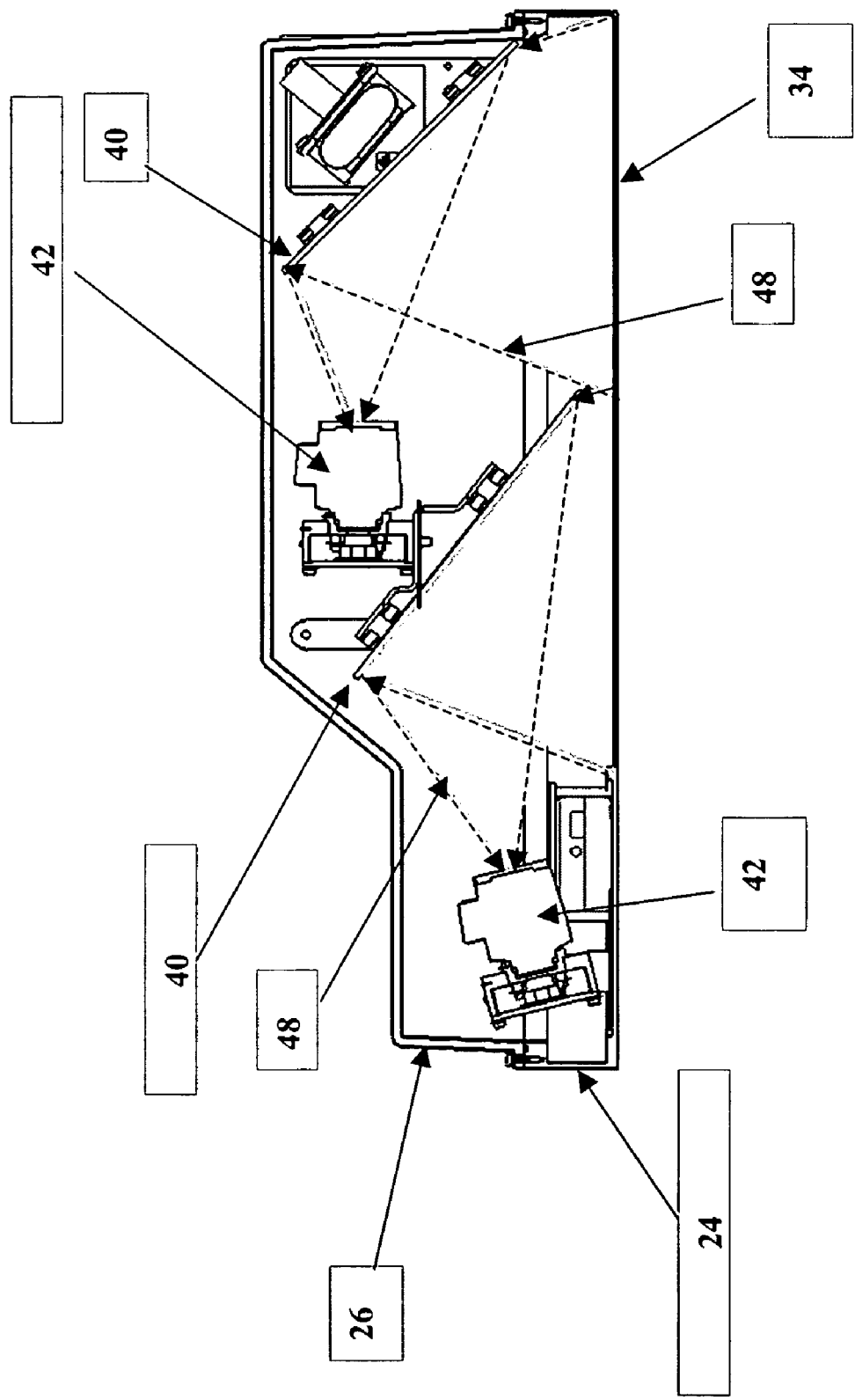
FIG. 4 illustrates a side-view perspective of the internal configuration of an imager component according to an embodiment of the present invention.

Referring to FIG. 3a, internally, according to a preferred embodiment of the present invention, the imager 14 includes four mirrors 40 for directing the converted photons along folded paths 48 from the scintillator screen 34 to four cameras 42. By way of example, each of the four cameras 42 may be a Cohu 8710-2/003 or similar camera. The preferred field of view of each camera is approximately 20.32 cm×27.94 cm (8.0 in×11 in). One skilled in the art recognizes the many alternative cameras that may be used and still fall within the scope of the invention described herein. The images collected by cameras 42 are preliminarily processed by video processors 44 which export information to the controller 16 of FIG. 1 through a direct Ethernet Connection or Ethernet hub/switch 46. A side view of the internal components of imager 14 is shown in FIG. 4, wherein the path of the converted photon beam 48 from scintillator screen 34 to mirrors 40 to cameras 42 is illustrated.

Figure 3B:
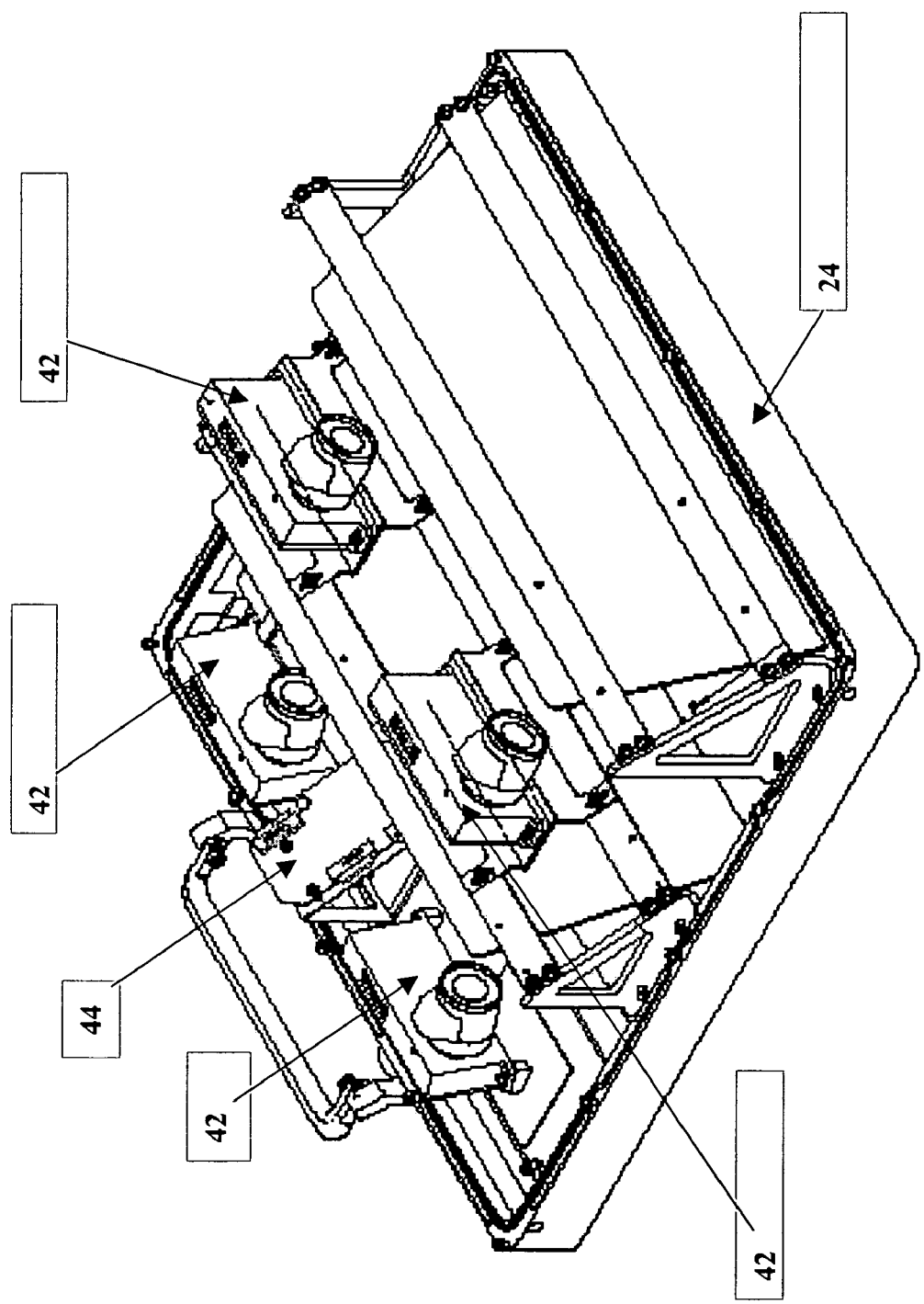

Alternatively, in FIG. 3b, the internal configuration of the imager 14 includes the components shown in FIG. 3a, the exception being that a single video processor 44 processes and exports information from all four cameras 42.

The imager is also equipped with a rotary switch (not shown) that allows for operating personnel to set a predetermined delay between turning on the imager power switch and the application of power to the main components of the imager. The rotary switch positions provide, for example, 20 second interval settings up to the 3 minute limit. Use of the rotary switch permits operating personnel to leave the immediate area before electromagnetic energy is applied near a suspect object for increased safety. This feature is useful during wireless operation.

In a preferred embodiment of the present invention, the video processors 44 are digital video transmission circuit cards ("DIVITS cards") that handle the command and control tasks between the controller 16, the X-ray source 12 and the cameras 42. Controller 16 is a control/display apparatus such as a laptop computer. Each of the DIVITS cards 44 communicates via standard TCP/IP Ethernet with the controller 16, using a custom communications protocol, and controls the firing of the X-ray source 12 while simultaneously gating it's camera's 42 integration interval. When X-ray firing is complete, the DIVITS card 44 reads the integrated image frame from the camera 42 and relays it, via the direct Ethernet connection or Ethernet hub/switch 46, to the controller 16 for processing and display.

Figure 5:
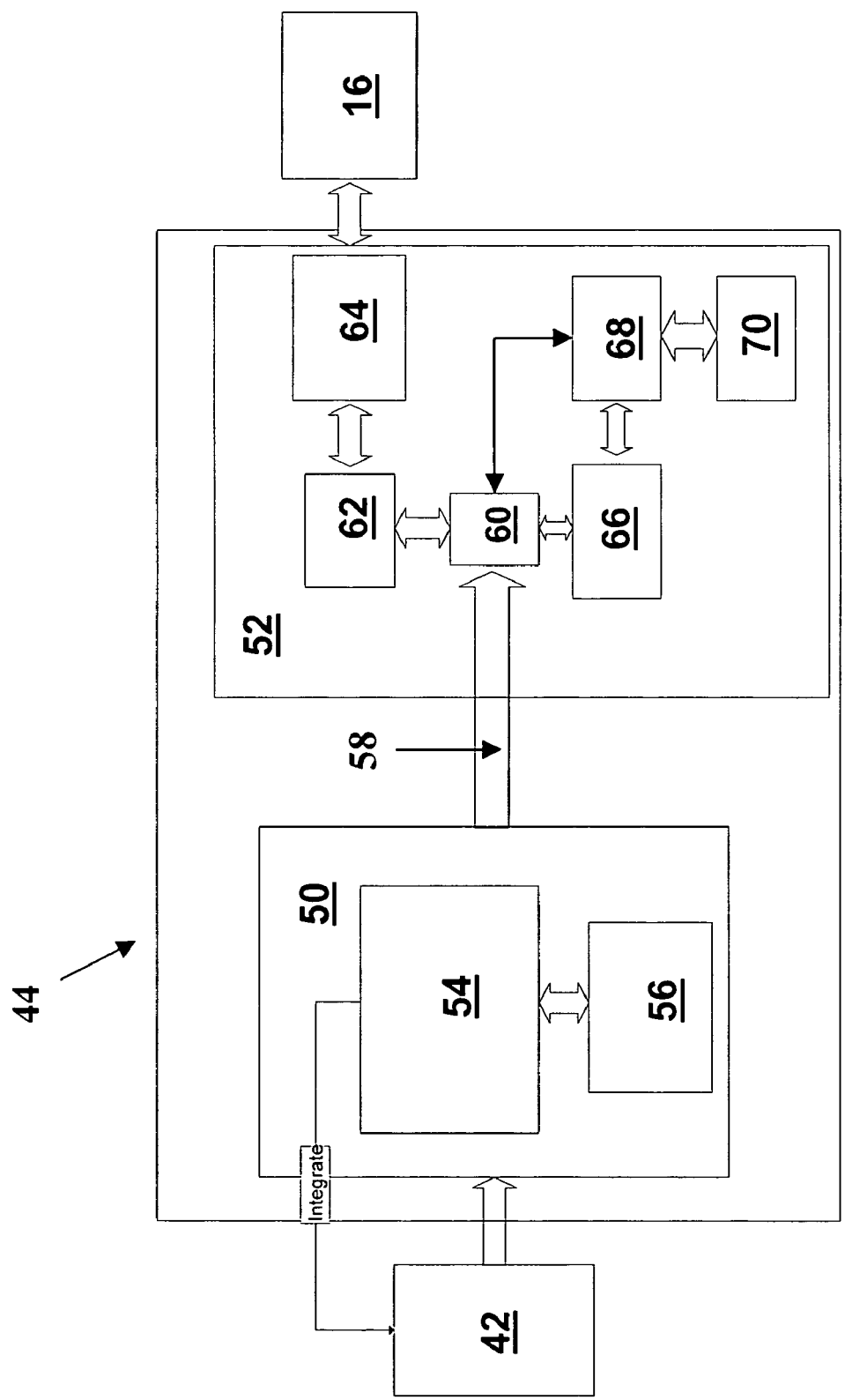
FIG. 5 illustrates a schematic for the image processing components according to a first embodiment of the present invention.

As shown in FIG. 5 each DIVITS card 44 consists of two distinct sub-circuits, the Data Acquisition Section ("DAS") 50 and the Data Processing/Transmission Section ("DPTS") 52. The DIVITS will provide an Ethernet true data throughput of at least 5 Mbit/sec. The DAS 50 includes a Field-Programmable Gate Array ("FPGA") 54 and appropriate field memory 56, e.g., 2×4-Mbytes banks of fast static RAM. An exemplary FPGA for use in the preferred embodiment from the Xilinx Spartan 3 family of devices, but is not limited thereto. The DAS 50 interfaces with the DPTS 52 via a bus, e.g., 16-bit PCMCIA, or equivalent parallel port 58. The DPTS 52 includes a direct access memory ("DMA") 60 for transferring imaging data to the controller 16 via a 10/100 Mbps Ethernet Interface 62 using an appropriate Ethernet media access control ("MAC") layer 64. The DAS also includes SDRAM 66, e.g., 64 MB, a central processing unit ("CPU") 68, e.g., 400 MHz Intel Xscale PXA255 processor, and flash memory 70, e.g., 32 MB.

Figure 6:
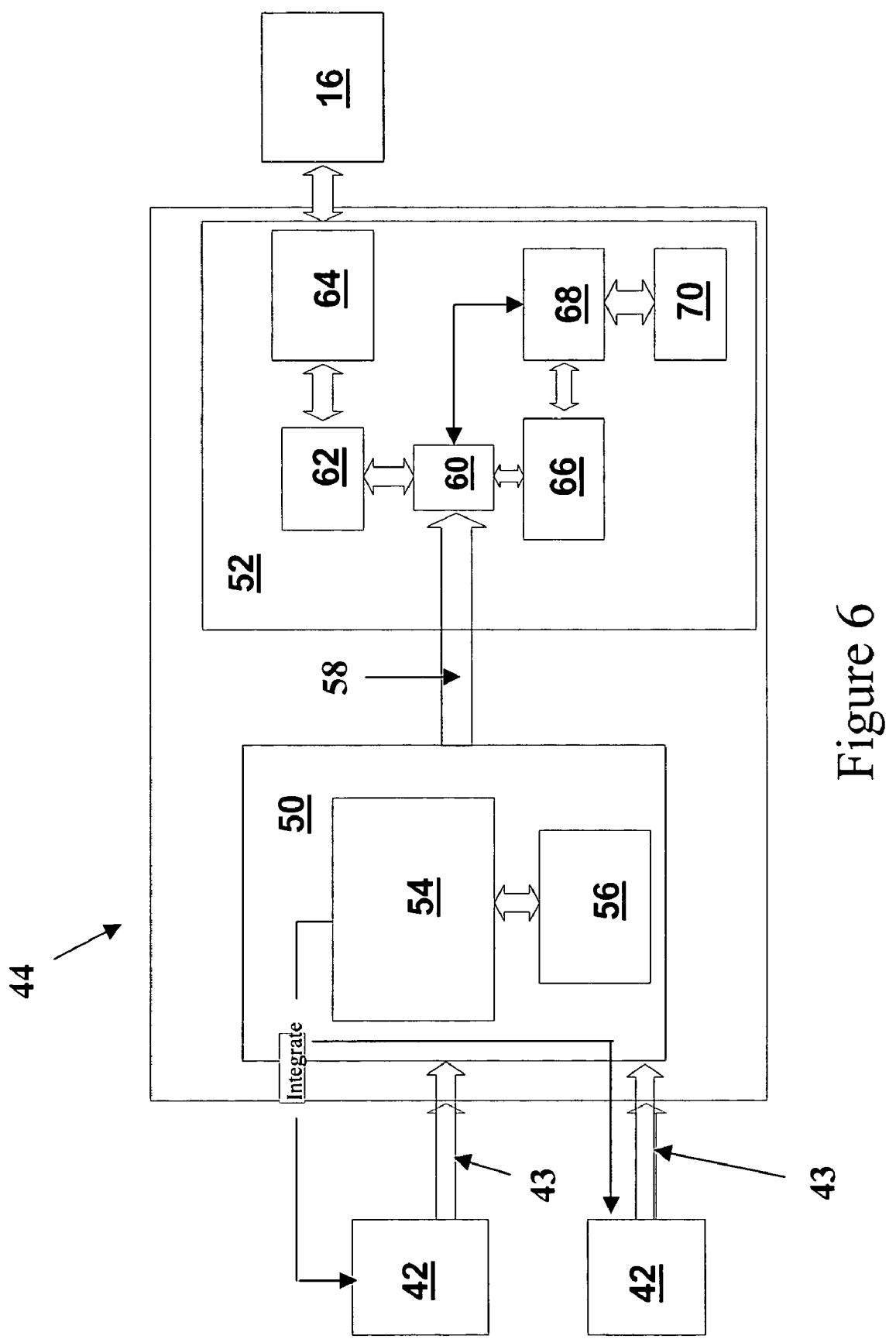
FIG. 6 illustrates a schematic for the image processing components according to a second embodiment of the present invention.

Alternatively, a single DIVITS card 44 may be used with all four cameras as shown in FIG. 6. In this alternative embodiment, the DAS 50 has four connectors 43 (only 2 shown) for interfacing with each of the four cameras 42 and is capable of switching power On and Off to each camera. The DAS 50 is capable of gating and acquiring four independent, simultaneous channels of, e.g., 10 bit, digital video data from the four cameras 42.

Figure 7:
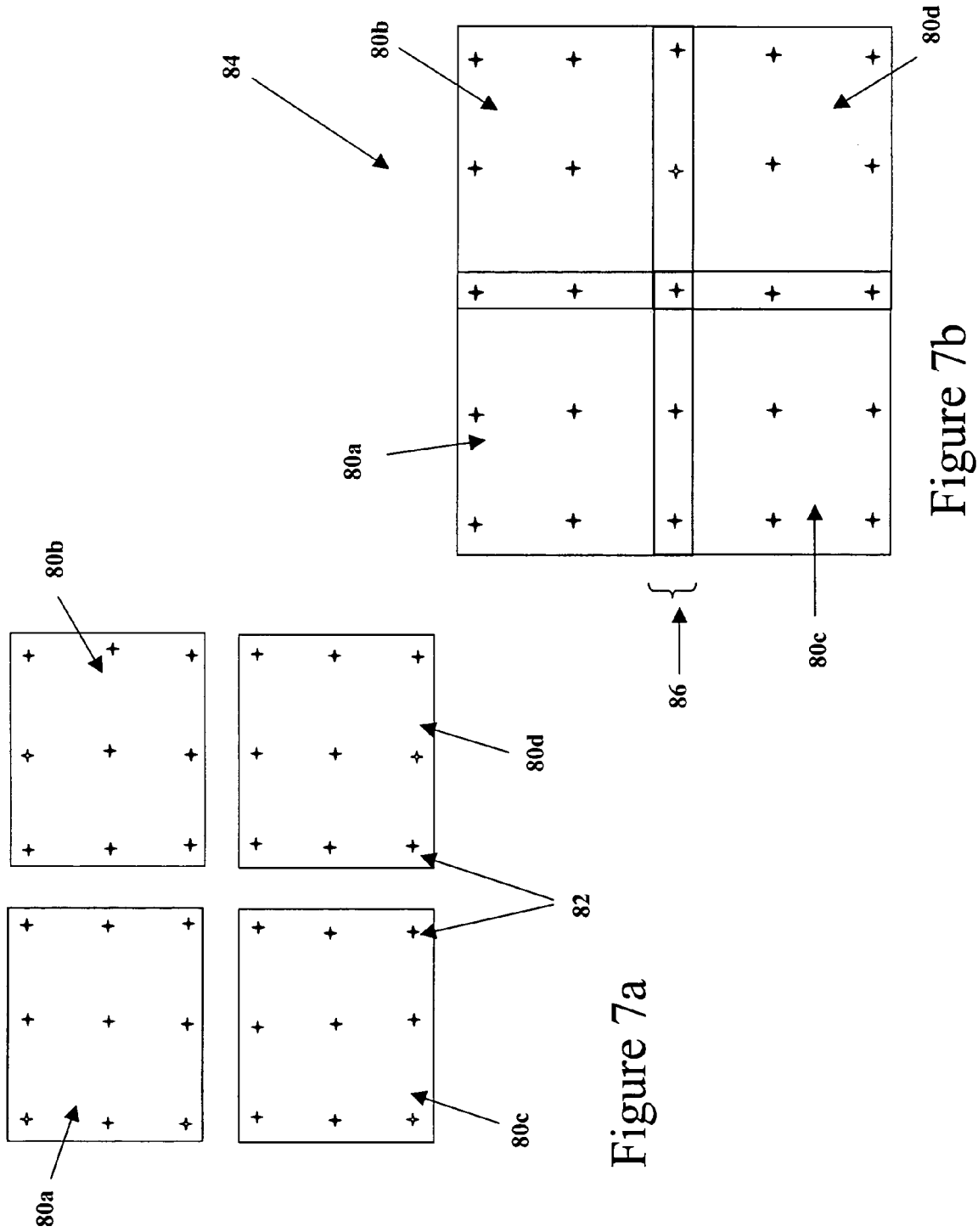
FIGS. 7a and 7b illustrate pre-overlap (FIG. 7a) and post-overlap (FIG. 7b) image fiducial arrangements according to an embodiment of the present invention.

Utilizing the four camera imager configuration described above, the imaging system of the present invention is able to provide an approximately 16"×22" image size, while maintaining the resolution of the 8"×11" single camera image. Referring to FIGS. 7a and 7b, in order to achieve this larger image while maintaining resolution, the individual images 8a–8d from each camera 42 are "stitched" together into one consistent image 84 by the controller 16, which includes a processor and appropriate software. The "stitching" is accomplished by overlapping each of the four images from each of the four cameras, such that each of the four cameras sees part of each of the other cameras' images. This overlapping region 86 is shown in FIG. 7b.

Using a series of embedded fiducials 82, the software recognizes the pattern of the embedded fiducials 82 in each image 80a–80d and computes the physical location of each pixel. A "stitched" image is then formed by defining a physical region that encompasses the valid area of all images combined, and reconstructing each pixel in the larger physical space from the single images. The reconstruction of a pixel value for each physical location is performed by a bilinear interpolation of the four neighboring pixel values in the appropriate single image. In an exemplary embodiment, 25 total fiducials are used, wherein any one camera can see 9 fiducials. The embedded fiducials 82 are located within the focal plane, but are semi-transparent and thus are not dense enough to interrupt the radiographic image. More particularly, the density of the fiducials 82 is essentially negated in the final image by increasing the intensity in the image area of each fiducial by the percentage needed to effectively make the fiducials "disappear" from the image. Accordingly, any object image details that were located in the path of a fiducial would be visible in the final radiographic image 84.

Figure 8:
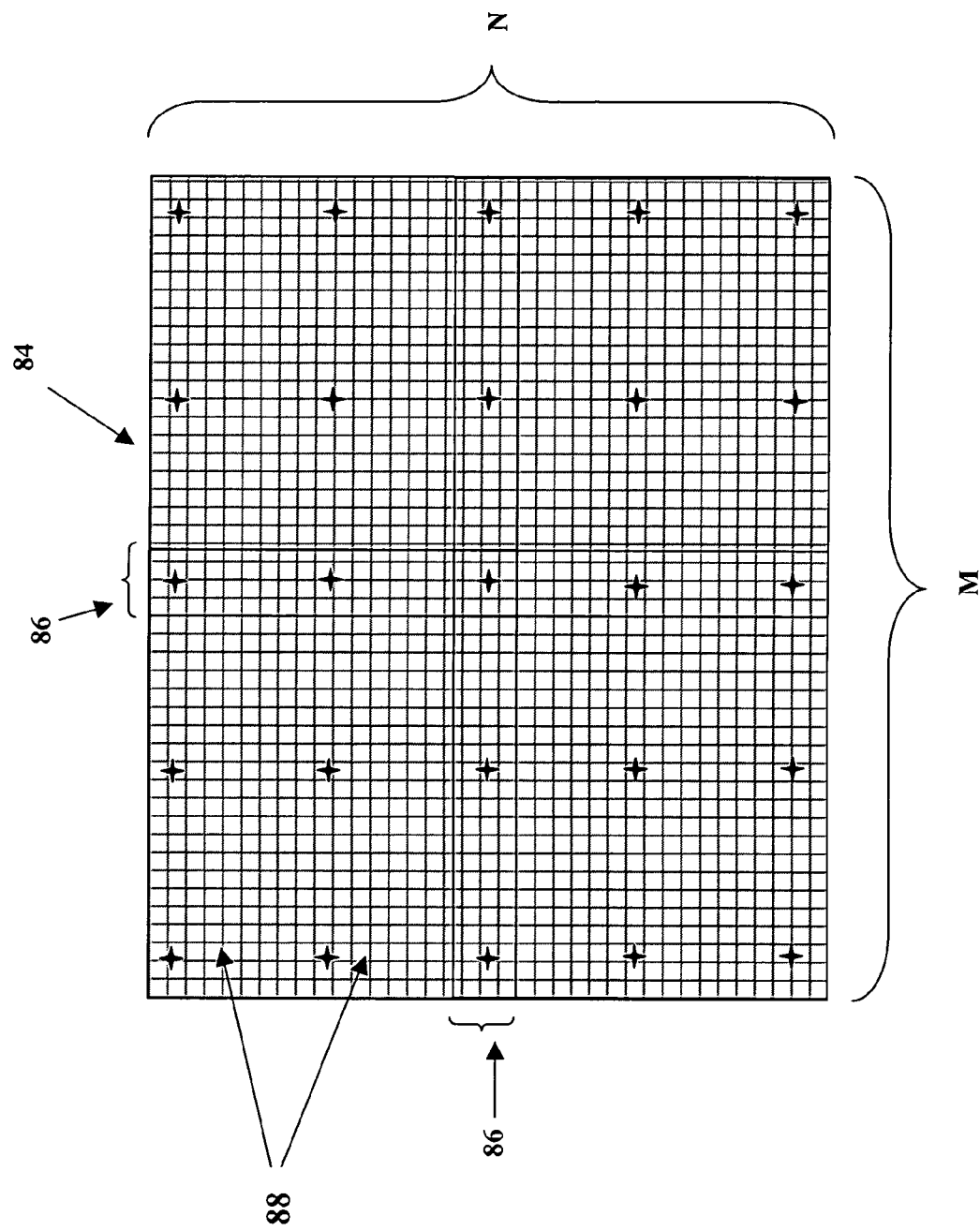
FIG. 8 illustrates an M×N array of pixels defining the physical space of a single image according to an embodiment of the present invention.

More specifically, referring to FIG. 8 the defined physical space of the final image 84 is comprised of M×N pixels 88. Utilizing fiducials 82, the controller aligns the pixels 88 in overlapping areas 86 of images 80a–80d and compensates for the density of the fiducials 82 to form an integrated, seamless final image 84 comprised of M×N pixels 88.

In an alternative embodiment, the fiducials are produced optically and alignment and calibration of the multiple images are performed prior to taking the radiographic image. In this alternative embodiment, multiple optical laser pointing devices project a fixed fiducial pattern onto the mirrored surfaces 40 (see FIG. 4), through the imaging cameras 42 (see FIG. 4) and ultimately to the imaging screen 21 (see FIG. 1). The fixed fiducial pattern image is collected from the imaging screen and the calibration procedure, described above, is conducted without an x-ray source and prior to image acquisition.

For those pixels 88 that are imaged by more than one camera 42, the controller merges, i.e., averages, the multiple images 80a–80d for the overlapping pixels 86 before mapping to the defined physical space M×N. Additionally, by mapping the pixels, utilizing the fiducials, back to the defined physical space, the controller is able to un-warp the final image by effectively negating the warping lens effects and orientation of the cameras. The controller is also able to account for the varying intensity profiles, resulting from slightly differing electronic biases (i.e. camera gain), from each of the cameras by modeling the intensity profile from the actual images.

A further advantage of the multi-camera, multi-mirror configuration is the ability to image to within approximately $\frac{1}{16}^{th}$ of an inch from one edge. In a situation where, for example, a suitcase set on the floor is being imaged, this would allow imaging of the suitcase all the way to the floor, with increased likelihood of imaging, e.g., a trigger device for an explosive device.

The imaging system described herein produces images in up to 256 shades of gray with resolution on the order of 1.3 line pairs per millimeter, i.e., system able to distinguish 1.3 or fewer pairs of bright and dark lines within one centimeter. The imaging system may function using cables or a wireless system (see the wireless module 30 of FIG. 2b) with a maximum distance from controller to object of 150 meters (492 feet) for the cable configuration and 200 meters (656 feet) for the wireless configuration. The imaging system can be powered by alternating current (AC) connection, direct current (DC) connection, or battery.

In addition to the description provided herein, the following documents include other details which may be useful in understanding the invention described herein and are incorporated herein by reference in their entireties: U.S. Pat. Nos. 6,389,105, 6,205,199, 6,178,224, 5,909,478, and 5,828,726 to Polichar et al.; SAIC's "RTR-4 Portable Digital X-Ray Imaging System, Training Workbook Version 1.0;" and "RTR-4 Portable Digital X-Ray Imaging System, Operator's Manual 120300 Rev. D."

The embodiments described above are intended to exemplary. One skilled in the art recognizes the numerous alternative components and embodiments which may be substituted for the particular examples described herein and still fall within the scope of the invention.

The invention claimed is:

1. A system for forming a single radiographic image of the contents of a target comprising:
    an imager for producing multiple partial radiographic images of the contents of the target;
    multiple fiducials located in an image plane of each of the multiple partial radiographic images configured to facilitate the alignment of each of the multiple partial radiographic images in an overlapping fashion to produce the single radiographic image of the contents of the target;
    a scintillation screen configured to convert non-visible radiation that has passed through the target into visible radiation;
    multiple reflective surfaces configured to reflect the visible radiation; and
    multiple image conversion devices configured to receive the reflected visible radiation from each of the multiple reflective surfaces and convert the visible radiation into representative electric signals.

2. The system according to claim 1, the non-visible radiation being x-ray radiation.

3. The system of claim 1, the imager further comprising at least one processing component configured to process the representative electrical signals.

4. The system of claim 3, the imager consisting of four reflective surfaces, four image conversion devices and four processing components configured to produce a single radiographic image of the contents of the target.

5. The system according to claim 3, the at least one processing component including a first processing section configured to acquire the representative electrical signals from at least one of the multiple image conversion devices.

6. The system according to claim 5, the at least one processing component including a second processing section configured to transmit the acquired representative electrical signals to a controller configured to align each of the multiple partial radiographic images in accordance with the multiple fiducials in an overlapping fashion to produce the single radiographic image of the contents of the target.

7. The system of claim 1, further comprising a controller configured to align each of the multiple partial radiographic images in accordance with the multiple fiducials in an overlapping fashion to produce the single radiographic image of the contents of the target.

8. The system according to claim 1, the multiple reflective surfaces being mirrors configured to direct the visible radiation along a folded path.

9. The system according to claim 1, the multiple image conversion devices being cameras.

10. The system according to claim 1, wherein the imager, when resting on a surface, is configured to image a target on the surface down to within $1/16^{th}$ of an inch from the surface.

11. A method for forming a single radiographic image of the contents of a target comprising:
    simultaneously producing multiple partial radiographic images of the contents of the target, each of the multiple partial radiographic images including multiple images of fiducials;
    aligning each of the multiple partial radiographic images according to the images of the multiple fiducials to produce the single radiographic image of the contents of the target; and
    visually removing the images of the multiple fiducials from the single radiographic image of the contents of the target.

12. The method according to claim 11, further comprising:
    transmitting non-visible radiation in the direction of the target;
    receiving at least part of the non-visible radiation at a conversion screen after the non-visible radiation passes through the target, the conversion screen being configured to convert the non-visible radiation into visible radiation representative of the contents of the target;
    reflecting the visible radiation off of multiple reflective elements; and
    collecting the reflected visible radiation at multiple image conversion devices, the multiple image conversion devices being configured to convert the reflected visible radiation into electrical signals representative of the multiple partial radiographic images of the contents of the target.

13. The method according to claim 12, further comprising:
    acquiring the electrical signals representative of the multiple partial radiographic images at at least one processing component; and
    transmitting the electrical signals representative of the multiple partial radiographic images from the at least one processing component to a controller.

14. The method according to claim 13, further comprising:
    aligning each of the multiple partial radiographic images according to the images of the multiple fiducials at the controller to produce the single radiographic image of the contents of the target; and
    visually removing the images of the multiple fiducials from the single radiographic image of the contents of the target at the controller.

15. The method according to claim 11, further comprising:
    defining a physical space of M×N pixels representative of the single radiographic image of the contents of the target;
    mapping each of the multiple partial radiographic images to the physical space, at least one subset of the M×N pixels containing pixel contributions from more than one of the multiple partial radiographic images.

16. The method according to claim 15, wherein at least one subset of the M×N pixels contains pixel contributions from each of the multiple partial radiographic images.

17. The method according to claim 15, further comprising:
    visually removing the images of the multiple fiducials from the single radiographic image of the contents of the target by increasing the intensity within each of the M×N pixels that includes the images of the multiple fiducials.

18. A system for forming a single radiographic image of the contents of a target comprising:
    means for simultaneously producing multiple partial radiographic images of the contents of the target, each of the multiple partial radiographic images including multiple images of fiducials;
    means for aligning each of the multiple partial radiographic images according to the images of the multiple fiducials to produce the single radiographic image of the contents of the target; and
    means for visually removing the images of the multiple fiducials from the single radiographic image of the contents of the target.

* * * * *